United States Patent
Zhang

(10) Patent No.: US 10,719,737 B2
(45) Date of Patent: Jul. 21, 2020

(54) IMAGE CLASSIFICATION SYSTEM FOR RESIZING IMAGES TO MAINTAIN ASPECT RATIO INFORMATION

(71) Applicant: DENSO International America, Inc., Southfield, MI (US)

(72) Inventor: Wei Zhang, Westland, WI (US)

(73) Assignee: DENSO International America, Inc., Southfield, MI (US)

( * ) Notice: Subject to any disclaimer, the term of this patent is extended or adjusted under 35 U.S.C. 154(b) by 155 days.

(21) Appl. No.: 16/110,308

(22) Filed: Aug. 23, 2018

(65) Prior Publication Data

US 2020/0065618 A1   Feb. 27, 2020

(51) Int. Cl.
*G06K 9/62* (2006.01)
*G06K 9/42* (2006.01)

(52) U.S. Cl.
CPC ............. *G06K 9/6251* (2013.01); *G06K 9/42* (2013.01); *G06K 9/6267* (2013.01)

(58) Field of Classification Search
CPC ....... G06K 9/6251; G06K 9/42; G06K 9/6267
See application file for complete search history.

(56) References Cited

U.S. PATENT DOCUMENTS

| | | | |
|---|---|---|---|
| 7,480,584 B2 | 1/2009 | Mitarai et al. | |
| 7,724,957 B2 | 5/2010 | Abdulkader | |
| 8,004,576 B2 | 8/2011 | Sharma | |
| 8,559,671 B2 | 10/2013 | Milanfar et al. | |
| 8,660,355 B2 | 2/2014 | Rodriguez et al. | |
| 9,117,111 B2 | 8/2015 | Mori et al. | |
| 9,418,458 B2 | 8/2016 | Chertok et al. | |
| 9,514,391 B2 | 12/2016 | Perronnin et al. | |
| 9,542,621 B2 | 1/2017 | He et al. | |
| 9,582,762 B1 | 2/2017 | Cosic | |
| 2014/0010477 A1* | 1/2014 | Kotani | ............ G06T 3/40 382/298 |
| 2016/0104056 A1 | 4/2016 | He et al. | |
| 2016/0210513 A1 | 7/2016 | Wang et al. | |

(Continued)

FOREIGN PATENT DOCUMENTS

| WO | WO-2016090520 A1 | 6/2016 |
|---|---|---|
| WO | WO-2017027475 A1 | 2/2017 |

OTHER PUBLICATIONS

"Fast R-CNN," R. Girshick, ICCV 2015.

(Continued)

*Primary Examiner* — Christopher M Brandt
(74) *Attorney, Agent, or Firm* — Harness, Dickey & Pierce, P.L.C.

(57) ABSTRACT

In an example, an image classification system is disclosed. The image classification system modifies an image having a first height and a first width to be input to a convolutional neural network for image classification. The image classification system includes an image resizing module that is configured to resize the image so that the resized image comprises a second height and a second width. An aspect ratio of the resized image corresponds to an aspect ratio of the image having the first height and the first width. The image classification system also includes an alignment module that is configured to modify pixels of a feature map corresponding to the resized image based upon a comparison of a desired feature map size and an actual feature map size.

18 Claims, 6 Drawing Sheets

(56) References Cited

U.S. PATENT DOCUMENTS

| | | | |
|---|---|---|---|
| 2016/0307071 A1* | 10/2016 | Perronnin | G06K 9/4628 |
| 2017/0061246 A1 | 3/2017 | Chen et al. | |
| 2017/0132769 A1 | 5/2017 | Barron et al. | |
| 2017/0147905 A1 | 5/2017 | Huang et al. | |
| 2017/0185871 A1 | 6/2017 | Zhang et al. | |
| 2017/0252922 A1 | 9/2017 | Levine et al. | |
| 2017/0317983 A1 | 11/2017 | Kompalli | |
| 2018/0032840 A1* | 2/2018 | Yu | G06K 9/00288 |
| 2019/0026538 A1* | 1/2019 | Wang | G06T 7/20 |
| 2019/0341110 A1* | 11/2019 | Tran | G11C 11/54 |

OTHER PUBLICATIONS

"Spatial Pyramid Pooling in Deep Convolutional Networks for Visual Recognition," K. He, X. Zhang, S. Ren, and J. Sun, IEEE Transactions on Pattern Analysis and Machine Intelligence (TPAMI), 2015.

tf.nn.convolution, TensorFlow, https://www.tensorflow.org/api_docs/python/tf/nn/convolution, Aug. 16, 2018.

* cited by examiner

IMAGE CLASSIFICATION SYSTEM FOR RESIZING IMAGES TO MAINTAIN ASPECT RATIO INFORMATION

BACKGROUND

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to image classification and more particularly to a convolutional processing image classification system that can resize a received image and modify a feature map.

Image processing typically includes the processing of pixel values of an image. The pixels can be arranged as an array that represent an image size. The pixel values are generated by an image capture device, such as a camera, that may be a still image or a sequence of still images.

Neural networks can be used in image classification, object detection, and other recognition tasks. A convolutional neural network is a type of deep, feed-forward neural network that is used to analyze multiple images. Convolutional neural networks typically include one or more convolutional layers, pooling layers, fully connected layers, and normalization layers.

SUMMARY

In an example, an image classification system is disclosed. The image classification system modifies an image having a first height and a first width to be input to a convolutional neural network for image classification. The image classification system includes an image resizing module that is configured to resize the image so that the resized image comprises a second height and a second width. An aspect ratio of the resized image corresponds to an aspect ratio of the image having the first height and the first width. The image classification system also includes an alignment module that is configured to modify pixels of a feature map corresponding to the resized image based upon a comparison of a desired feature map size and an actual feature map size.

In other features, the second width is equal to $int(a_1 * \sqrt{r})$, where int is an integer operation, $a_1$ is at least one of a desired number of pixels of a width of the resized image or a desired number of pixels of a height of the resized image and r is the aspect ratio of the image having the first height and the first width.

In other features, the second height is equal to $$int\left(\frac{a_1}{\sqrt{r}}\right),$$

where int is an integer operation, $a_1$ is at least one of a desired number of pixels of a width of the resized image or a desired number of pixels of a height of the resized image and r is the aspect ratio of the image having the first height and the first width.

In other features, the alignment module is further configured to at least one of removes the pixels from the feature map or add the pixels to the feature map based upon the comparison.

In other features, the alignment module is further configured to remove the pixels from the feature map when the comparison indicates the actual feature map size is greater than the desired feature map size.

In other features, the alignment module is further configured to add the pixels to the feature map when the comparison indicates the actual feature map size is less than the desired feature map size.

In other features, the image classification system also includes a convolution module that is configured to receive the resized image and output the feature map based upon the resized image.

In other features, the convolution module is further configured to apply one or more convolution operations to the resized image.

In other features, the aspect ratio of the resized image approximately equals the aspect ratio of the image having the first height and the first width.

In other features, the image classification system also includes a predictor module that is configured to generate a prediction based upon the feature map.

In an example, a method for modifying an image having a first height and a first width to be input to a neural network for image classification is disclosed. The method includes resizing the image so that the resized image comprises a second height and a second width. An aspect ratio of the resized image corresponds to an aspect ratio of the image having the first height and the first width. The method also includes modifying pixels of a feature map corresponding to the resized image based upon a comparison of a desired feature map size and an actual feature map size.

In other features, the second width is equal to $int(a_1 * \sqrt{r})$, where int is an integer operation, $a_1$ is at least one of a desired number of pixels of a width of the resized image or a desired number of pixels of a height of the resized image and r is the aspect ratio of the image having the first height and the first width.

In other features, the second height is equal to $$int\left(\frac{a_1}{\sqrt{r}}\right),$$

where int is an integer operation, $a_1$ is at least one of a desired number of pixels of a width of the resized image or a desired number of pixels of a height of the resized image and r is the aspect ratio of the image having the first height and the first width.

In other features, the method includes at least one of removing the pixels from the feature map or adding the pixels to the feature map based upon the comparison.

In other features, the method includes removing the pixels from the feature map when the comparison indicates the actual feature map size is greater than the desired feature map size.

In other features, the method includes adding the pixels to the feature map when the comparison indicates the actual feature map size is less than the desired feature map size.

In other features, the method includes receiving the resized image and outputting the feature map based upon the resized image.

In other features, the method includes applying one or more convolution operations to the resized image.

In other features, the aspect ratio of the resized image approximately equals the aspect ratio of the image having the first height and the first width.

In other features, the method includes generating a prediction based upon the feature map.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Typically, input images to neural networks, such as convolutional networks, are required to have the same size (e.g., the pixel length and the pixel width) as feature maps output by the neural networks. However, original images can have different sizes, which requires resizing prior to input to the neural networks. Thus, these images are typically resized to a fixed pixel width and a fixed pixel height, which results in a fixed aspect ratio.

However, in some learning tasks, aspect ratio is the most useful information for image classification purposes. For example, to classify a vehicle as a sports utility vehicle or a sedan from an image, the neural network would typically require the vehicle's height to width ratio. However, if an original image of a vehicle is resized prior to image classification, the neural network may not be able accurately classify the type of vehicle based upon the resized aspect ratio. The present disclosure is directed to an image classification system and method that is configured to resize images such that the aspect ratios of the resized image corresponds to the aspect ratio of the original image. Additionally, the system and method can modify, or align, feature maps after convolutional layer processing such that the feature maps are the same size for the later processing layers.

Figure 1C:
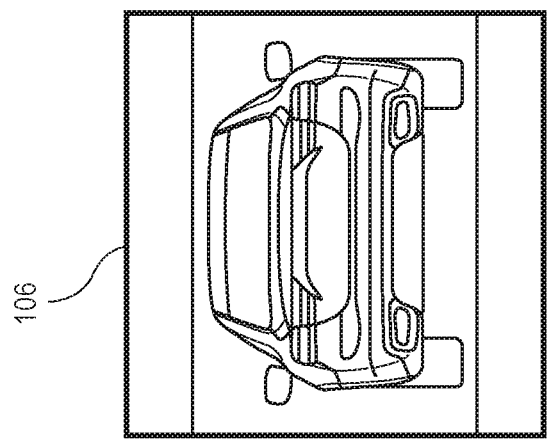
FIG. 1C is an image of the vehicle in FIG. 1A having a third pixel width, a third pixel height, and a third aspect ratio that corresponds to the first aspect ratio.
Figure 1B:
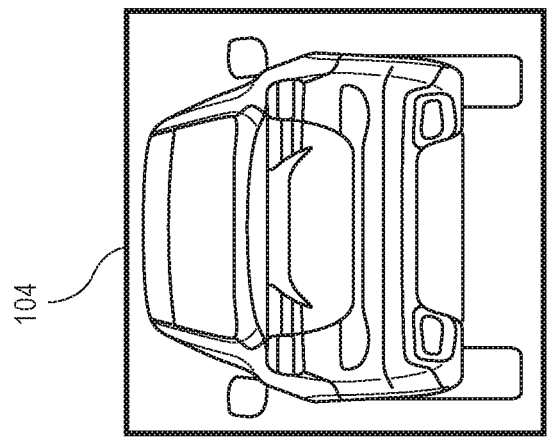
FIG. 1B is an image of the vehicle in FIG. 1A having a second pixel width, a second pixel height, and a second aspect ratio.
Figure 1A:
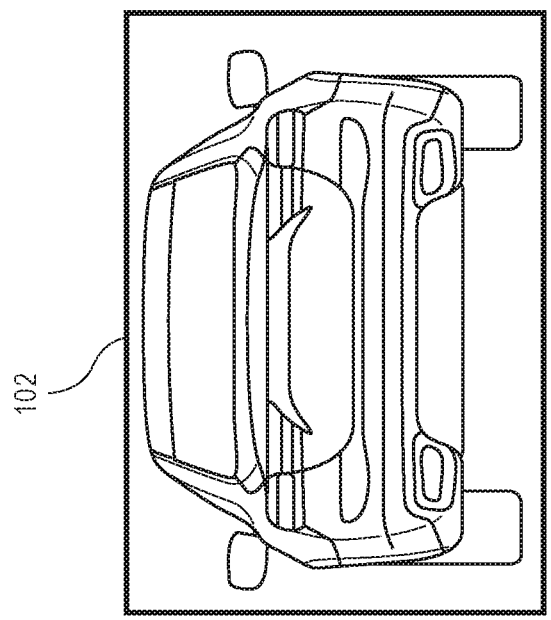
FIG. 1A is an image of a vehicle having a first pixel width, a first pixel height, and a first aspect ratio.

FIGS. 1A through 1C illustrate example images of the same vehicle. More specifically, FIG. 1A illustrates a first image 102 (i.e., original image) having a first length, a first width, and a first aspect ratio. FIG. 1B illustrates a resized first image 104 having a second length, a second width, and a second aspect ratio. FIG. 1C illustrates a resized image 106 of the first image 102 having a third length, a third width, and a third aspect ratio that is approximately equal to the first aspect ratio. As described herein, the present disclosure describes an image resizing system that receives a first image, such as the first image 102, and generates a resized image, such as the resized image 106, that has an aspect ratio that corresponds to the first image.

Figure 2:
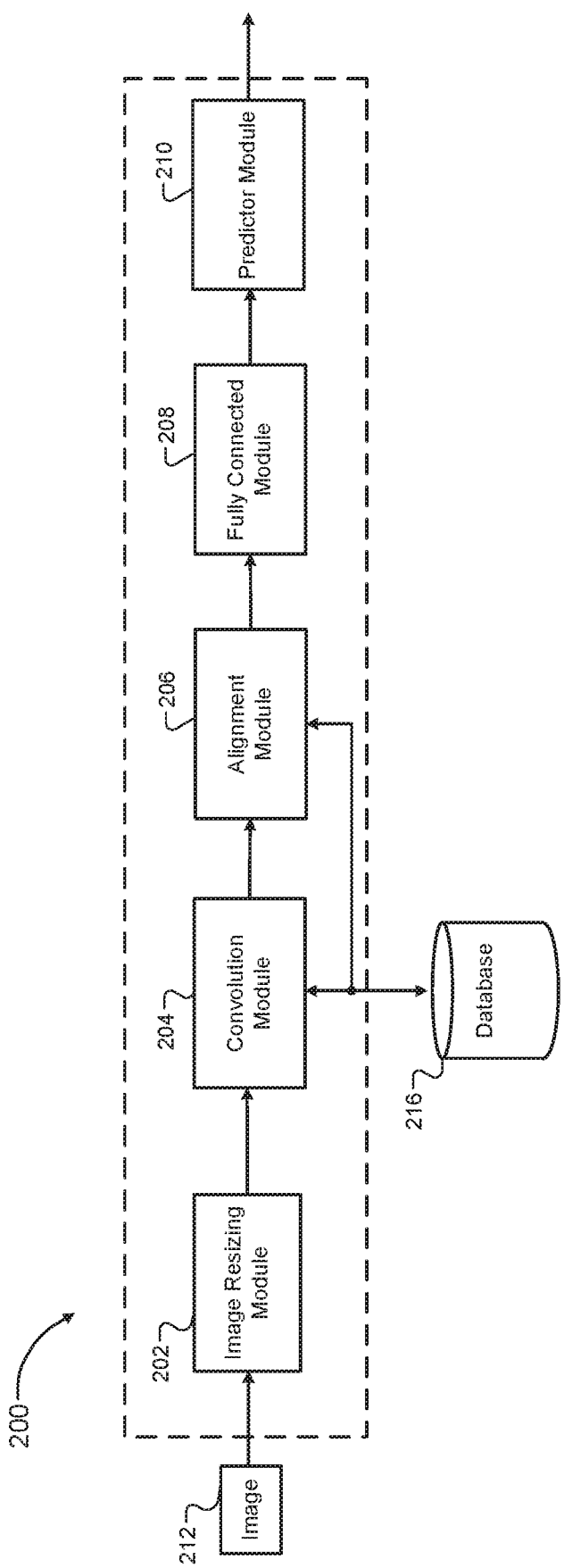
FIG. 2 is a block diagram illustrating an image classification system according to an example implementation of the present disclosure.

FIG. 2 illustrates an example block diagram of an image classification system 200 in accordance with an example implementation of the present disclosure. The image classification system 200 includes an image resizing module 202, a convolution module 204, an alignment module 206, a fully connected module 208, and a predictor module 210. The image classification system 200 receives an image 212 having image size having an aspect ratio and generates a resized image 214 having an aspect ratio that corresponds to the aspect ratio of the image 212.

Figure 3:
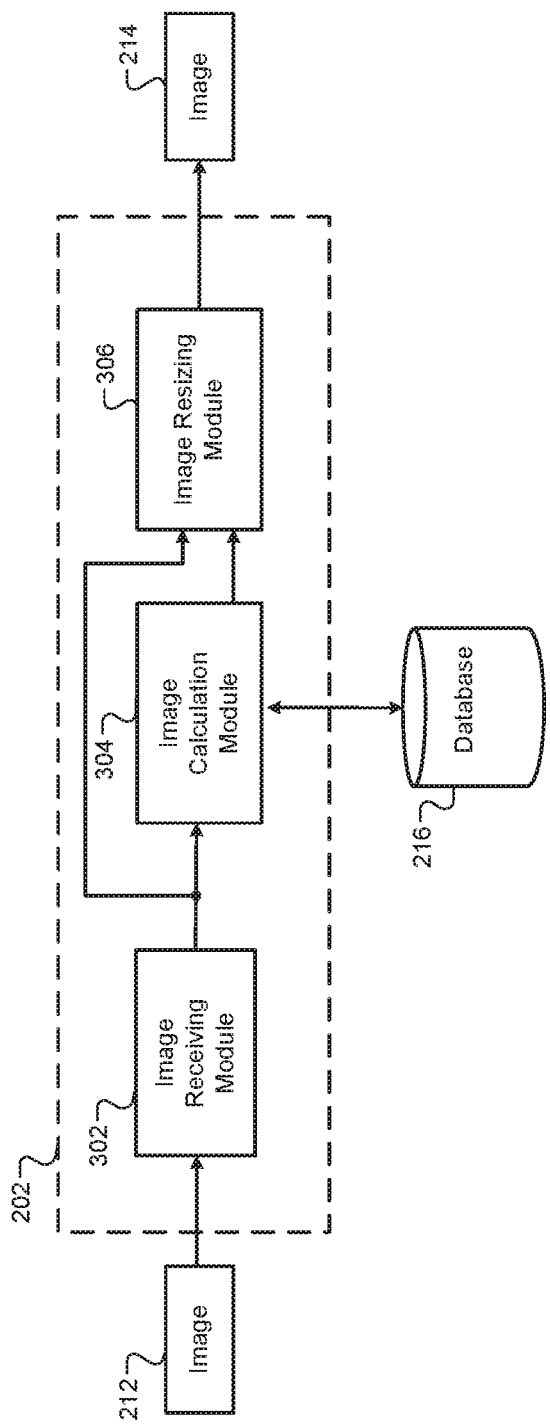
FIG. 3 is a block diagram of an image resizing module of the image classification system according to an example implementation of the present disclosure.

The image resizing module 202 generates the resized image 214, and the resized image is input to the convolution module 204 for convolutional image processing operations. FIG. 3 illustrates an example image resizing module 202. The image resizing module 202 includes an image receiving module 302 that receives the image 212, and the image receiving module 302 provides the received image 212 to an image calculation module 304.

The image calculation module 304 retrieves a predetermined image size based upon the received image 212. For example, the image calculation module 304 may access a database 216 to retrieve the predetermined image size based upon the size of the image 212. The predetermined image size represents a desired image size of an image to be input to the convolution module 204.

The predetermined image size comprises the desired number of overall pixels $(a_1)^2$ of the resized image 214 (e.g., $a_1 * a_1$), where $a_1$ is the desired number of height pixels for the resized image 214 or the desired number of width pixels for the resized image 214. The image calculation module 304 calculates the width oil of the resized image 214 and the height $h_1$ of the resized image 214 according to Equations 1 and 2:

$$w_1 = int(a_1 * \sqrt{r}), \qquad \text{Eq. 1}$$

$$h_1 = int\left(\frac{a_1}{\sqrt{r}}\right), \qquad \text{Eq. 2}$$

where int represents an integer rounding operation and r represents the aspect ratio of the image 212. For example, the integer rounding operation rounds the value to the nearest integer value. Based upon this calculation, $w_1 * h_1 \approx a_1 * a_1$ and $r' \approx r$, where r' represents the aspect ratio of the resized image 214.

The image resizing module 202 also includes an image resizing module 306 that receives the image 212 from the image receiving module 302 and data representing $w_1$ and $h_1$. The image resizing module 306 resizes the image 212 based upon the received data to generate the resized image 214 that includes the aspect ratio r', which corresponds to the aspect ratio r. For example, the aspect ratio r' is approximately equal to the aspect ratio r. In an example implementation, the difference between the aspect ratio r' the aspect ratio r may be three percent (3%) or less. The image resizing module 306 outputs the resized image 214, and the resized image 214 is input to the convolution module 204. The image resizing module 306 utilizes any suitable image scaling operation to resize the image 212 to $w_1*h_1$.

The convolution module 204 performs convolution operations and, in some implementations, pooling operations on the received resized image 214 to generate one or more feature maps, such as feature maps 401 (see FIG. 4), which serve as input to the next layer. In some implementations, the convolution module 204 may also perform non-linearity operations on the feature maps. It is understood that the convolution module 204 may include any number of convolution and pooling layers to perform any number convolution and pooling operations based upon the design of the convolution module 204.

Figure 4:
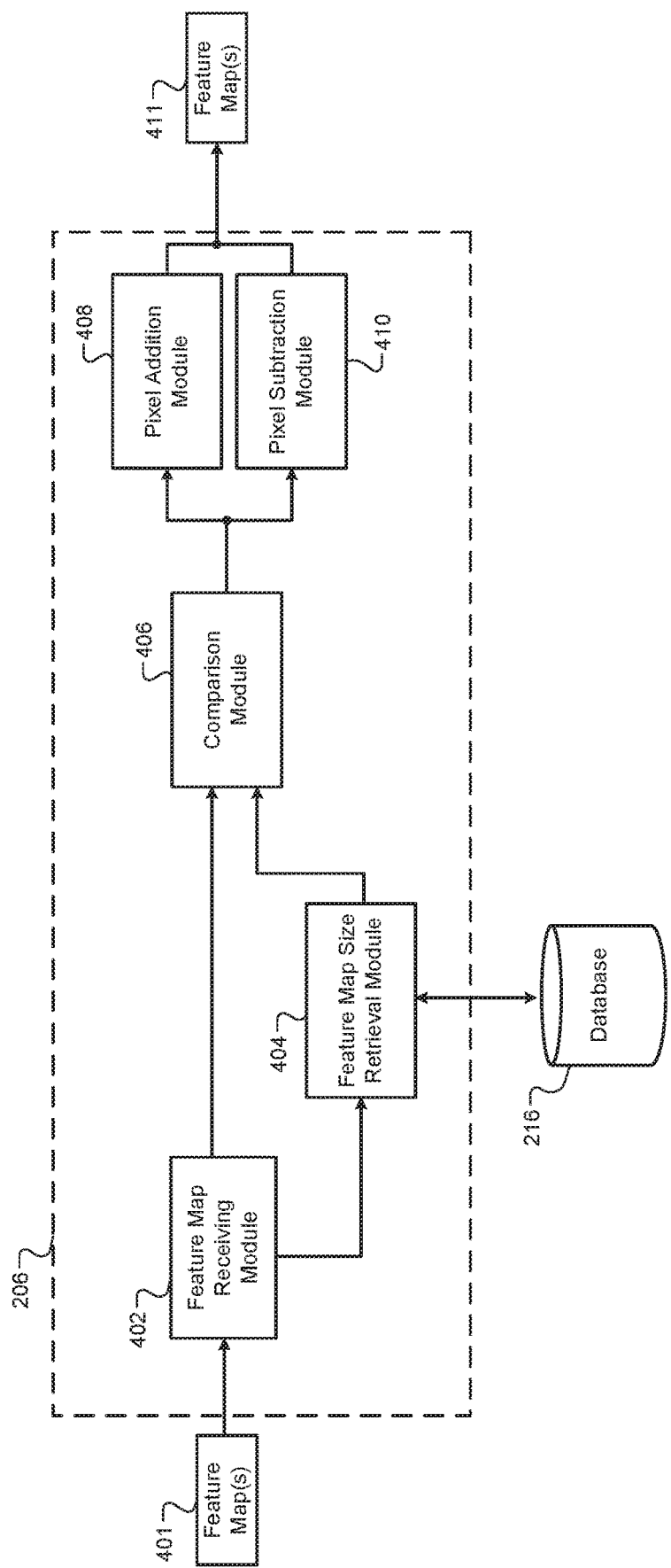
FIG. 4 is a block diagram of an alignment module of the image classification system according to an example implementation of the present disclosure.

FIG. 4 illustrates an example alignment module 206 in accordance with the present disclosure. The alignment module 206 includes a feature map receiving module 402, a feature map size retrieval module 404, a comparison module 406, a pixel addition module 408, and a pixel subtraction module 410.

In various implementations, a feature map 401 having a size of $w_2*h_2$ output by the convolution module 204 does not equal $a_2*a_2$. The alignment module 206 modifies the feature map 401 based upon a comparison of $w_2*h_2$ and $a_2*a_2$. For example, based upon the comparison, the alignment module 206 can remove a determined number of pixels from the feature map 401 or add a determined number of pixels to the feature map 401 to make the number of pixels equal to $a_2*a_2$. The alignment module 206 outputs a modified feature map 411 for further image processing.

In an example implementation, the feature map receiving module 402 receives one or more feature maps 401 from the convolution module 204. The number of feature maps 401 may correspond to a number of channels c associated with the image 212. Thus, the total number of pixels may be $c*(a_2*a_2)$. A channel may correspond to a property of the image 212. For example, a channel may refer to a particular color of the image 212, and the like.

The feature map(s) 401 each have a size of $w_2*h_2$, where $w_2$ is the number of width pixels and $h_2$ is the number of height pixels. The alignment module 206 modifies the feature map 401 such that the number of pixels of each feature map 401 (i.e., $w_2*h_2$ pixels) output by the convolution module 204 equals the desired feature map size (e.g., a predetermined feature map size), which is $a_2*a_2$ pixels.

The feature map receiving module 402 sends a signal to the feature map size retrieval module 404 indicating receipt of the feature map 401. The desired feature map size is retrieved from the database 216 by the feature map size retrieval module 404 and is provided to the comparison module 406. The comparison module 406 compares $w_2*h_2$ to $a_2*a_2$ to determine a difference, such as $(w_2*h_2 - a_2*a_2)$, and provides a signal indicative of the difference to the pixel addition module 408 and/or the pixel subtraction module 410. For example, when $w_2*h_2$ is less than $a_2*a_2$, the comparison module 406 provides the difference signal to the pixel addition module 408 to add pixels equal to the difference to each feature map 401. In another example, when $w_2*h_2$ is greater than $a_2*a_2$, the comparison module 406 provides the difference signal to the pixel subtraction module 410 to subtract pixels equal to the difference from each feature map 401.

The pixels can be added or subtracted from the feature map 401 in a number of ways. For example, pixels can be added or subtracted from an end of the feature map 401 (e.g., the image vector representing the feature map 401) to create a modified feature map 411. In another example, the pixels can be added or subtracted from the feature map 401 randomly to create the modified feature map 411. In yet another example, the pixel subtraction module 410 removes pixels having the smallest value from the feature map 401 to create the modified feature map 411. The modified feature map 411 retains at least substantially all of the original information of the feature map 401. For example, the modified feature map 411 may retain between approximately ninety-seven percent (97%) and ninety-nine percent (99%) of the information corresponding to the feature map 401.

Referring to FIG. 2, the feature map 411 is provided to the fully connected module 208 that further classifies the feature map 411 and outputs image classification data based upon the classification. The fully connected module 208 provides the image classification data to the predictor module 210, and the predictor module 210 outputs data representing a prediction based upon the image classification.

Figure 5:
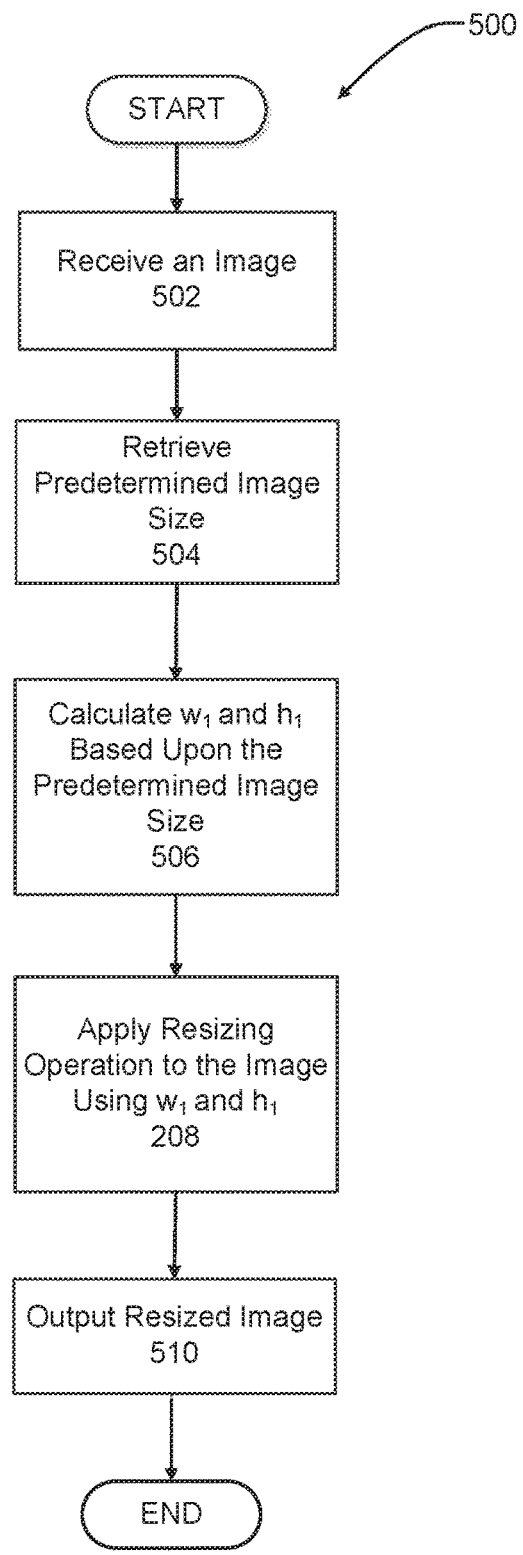
FIG. 5 is a flow diagram illustrating an example method for resizing an image according to an example implementation of the present disclosure.

FIG. 5 illustrates a method 500 of for generating an image having an aspect ratio corresponding to the aspect ratio of a received image. The method is described in the context of the modules included in the example implementation of the image resizing module 202 shown in FIGS. 2 and 3 in order to further describe the functions performed by those modules. However, the particular modules that perform the steps of the method may be different than the description below and/or the method may be implemented apart from the modules of FIGS. 2 and 3. For example, the method may be implemented by a single module.

At 502, an image 212 is received at the image receiving module 302. The image calculation module 304 retrieves the predetermined image size, or desired number of pixels, $(a_1)^2$ from the database 216 at 504. At 506, the image calculation module 304 calculates the width of $w_1$ of the resized image 214 and the height of $h_1$ of the resized image 214 based upon the desired number of pixels, as set forth in Equations 1 and 2 above. The image resizing module 306 applies a resizing operation to the image 212 corresponding to the calculated width and height at 508. At 510, the resized image is output for convolutional operations. As discussed above, the size of resized image 214 comprises the width of $w_1$ and the height of $h_1$.

Figure 6:
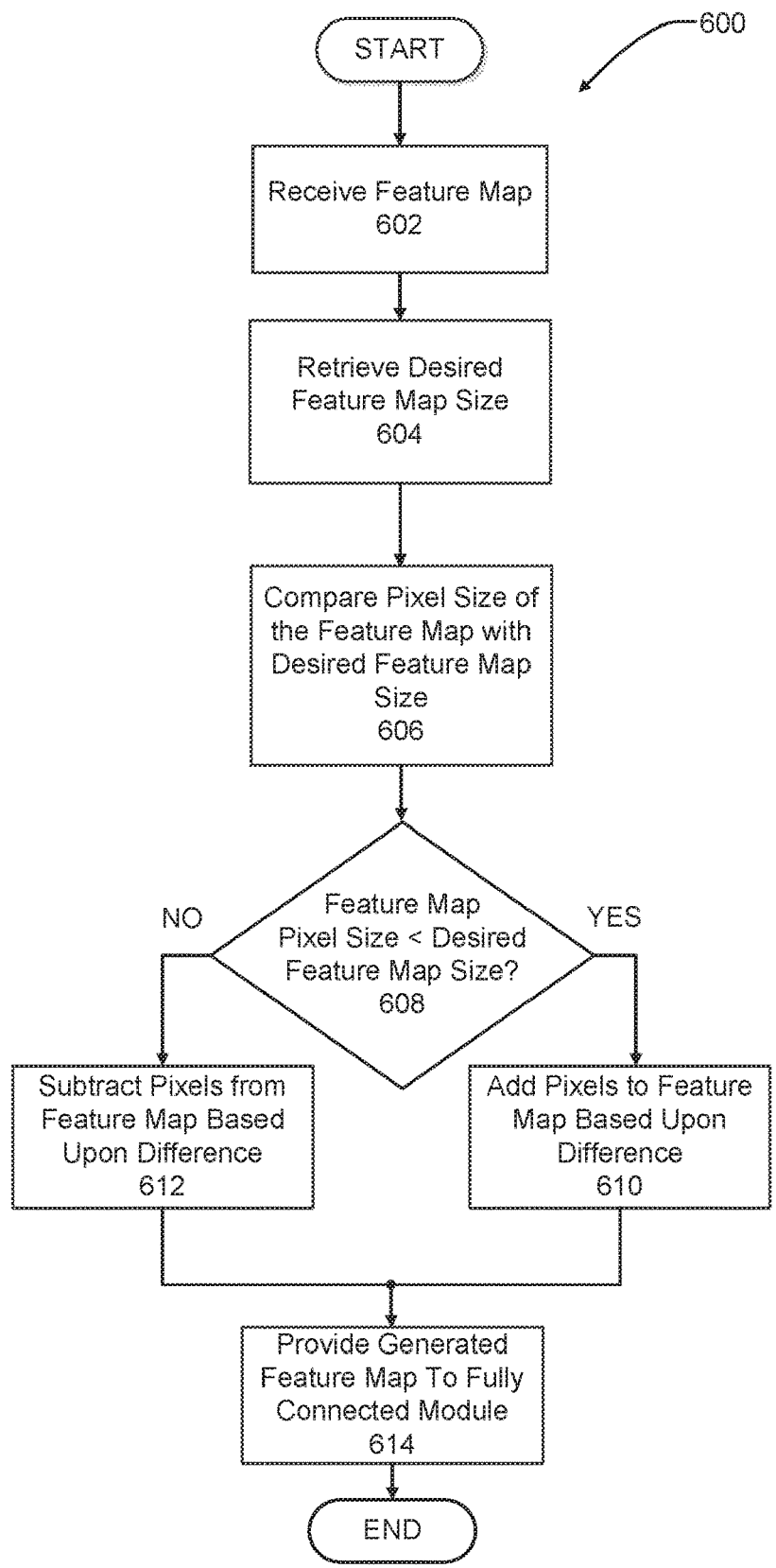
FIG. 6 is a flow diagram illustrating an example method for modifying a feature map according to an example implementation of the present disclosure.

FIG. 6 illustrates a method 600 of for generating a resized image having an aspect ratio corresponding to the aspect ratio of a received image. The method is described in the context of the modules included in the example implementation of the alignment module 206 shown in FIGS. 2 and 4 in order to further describe the functions performed by those modules. However, the particular modules that perform the steps of the method may be different than the description below and/or the method may be implemented apart from the modules of FIGS. 2 and 4. For example, the method may be implemented by a single module.

At 602, a feature map 401 is received at the feature map receiving module 402. At 604, the feature map size retrieval module 404 retrieves the desired feature map size. Upon retrieval, the desired feature map size is provided to the comparison module 406. At 606, the comparison module 406 compares the actual pixel size $w_2*h_2$ of the feature map 401 with the desired feature map size $a_2*a_2$.

At 608, the comparison module 406 determines whether the pixel size $w_2*h_2$ is greater than or less than desired feature map size $a_2*a_2$. At 610, the pixel addition module 408 adds a determined number of pixels to the feature map 401 when the pixel size $w_2*h_2$ is less than the feature map size $a_2*a_2$. At 612, the pixel subtraction module 410 removes a determined number of pixels from the feature map 401 when the pixel size $w_2 * h_2$ is greater than the feature map size $a_2$ $a_2$. At 614, the modified feature map 411 is provided to the fully connected module 208.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. An image classification system for modifying an image having a first height and a first width to be input to a convolutional neural network for image classification, the image classification system comprising:
   an image resizing module that is configured to resize the image so that the resized image comprises a second height and a second width, wherein an aspect ratio of the resized image corresponds to an aspect ratio of the image having the first height and the first width; and
   an alignment module that is configured to modify pixels of a feature map corresponding to the resized image based upon a comparison of a desired feature map size and an actual feature map size;
   wherein the second width is equal to int($a_1$*$\sqrt{r}$), where int is an integer operation, $a_1$ is at least one of a desired number of pixels of a width of the resized image or a desired number of pixels of a height of the resized image and r is the aspect ratio of the image having the first height and the first width.

2. The image classification system as recited in claim 1, wherein the second height is equal to $$int\left(\frac{a_1}{\sqrt{r}}\right),$$

where int is an integer operation, $a_1$ is at least one of a desired number of pixels of a width of the resized image or a desired number of pixels of a height of the resized image and r is the aspect ratio of the image having the first height and the first width.

3. The image classification system as recited in claim 1, wherein the alignment module is further configured to at least one of remove the pixels from the feature map or add the pixels to the feature map based upon the comparison.

4. The image classification system as recited in claim 3, wherein the alignment module is further configured to remove the pixels from the feature map when the comparison indicates the actual feature map size is greater than the desired feature map size.

5. The image classification system as recited in claim 4, wherein the alignment module is further configured to add the pixels to the feature map when the comparison indicates the actual feature map size is less than the desired feature map size.

6. The image classification system as recited in claim 1, further comprising a convolution module that is configured to receive the resized image and output the feature map based upon the resized image.

7. The image classification system as recited in claim 6, wherein the convolution module is further configured to apply one or more convolution operations to the resized image.

8. The image classification system as recited in claim 1, wherein the aspect ratio of the resized image approximately equals the aspect ratio of the image having the first height and the first width.

9. The image classification system as recited in claim 1, further comprising a predictor module that is configured to generate a prediction based upon the feature map.

10. A method for modifying an image having a first height and a first width to be input to a neural network for image classification, the method comprising:
    resizing the image so that the resized image comprises a second height and a second width, wherein an aspect ratio of the resized image corresponds to an aspect ratio of the image having the first height and the first width; and
    modifying pixels of a feature map corresponding to the resized image based upon a comparison of a desired feature map size and an actual feature map size;
    wherein the second width is equal to int($a_1$*$\sqrt{r}$), where int is an integer operation, $a_1$ is at least one of a desired number of pixels of a width of the resized image or a desired number of pixels of a height of the resized image and r is the aspect ratio of the image having the first height and the first width.

11. The method as recited in claim 10, wherein the second height is equal to $$int\left(\frac{a_1}{\sqrt{r}}\right),$$

where int is an integer operation, $a_1$ is at least one of a desired number of pixels of a width of the resized image or a desired number of pixels of a height of the resized image and r is the aspect ratio of the image having the first height and the first width.

12. The method as recited in claim 10, further comprising at least one of removing the pixels from the feature map or adding the pixels to the feature map based upon the comparison.

13. The method as recited in claim 12, further comprising removing the pixels from the feature map when the comparison indicates the actual feature map size is greater than the desired feature map size.

14. The method as recited in claim 13, further comprising adding the pixels to the feature map when the comparison indicates the actual feature map size is less than the desired feature map size.

15. The method as recited in claim 10, further comprising receiving the resized image and outputting the feature map based upon the resized image.

16. The method as recited in claim 15, further comprising applying one or more convolution operations to the resized image.

17. The method as recited in claim 10, wherein the aspect ratio of the resized image approximately equals the aspect ratio of the image having the first height and the first width.

18. The method as recited in claim 10, further comprising generating a prediction based upon the feature map.

* * * * *